Aug. 31, 1948.　　R. M. HEINTZ ET AL　　2,448,369
ENGINE BEARING CONSTRUCTION
Filed April 18, 1946

INVENTORS
RALPH M. HEINTZ
JOHN W. FRAZIER
BY
ATTORNEY

Patented Aug. 31, 1948

2,448,369

UNITED STATES PATENT OFFICE 2,448,369

ENGINE BEARING CONSTRUCTION

Ralph M. Heintz, Cleveland, and John W. Frazier, Shaker Heights, Ohio, assignors to Jack & Heintz Precision Industries, Inc., Cleveland, Ohio, a corporation of Delaware Application April 18, 1946, Serial No. 663,198

5 Claims. (Cl. 308—23)

1

This invention relates to engine bearing construction and has for one of its primary objects to provide an improved main bearing and a removable bearing block for an engine crankshaft.

More particularly it is an object of the invention to provide a main bearing assembly that will include a solid main bearing block that is removably secured to the engine block and specially treated so as to be adapted to receive an engine crankshaft that has its bearing metal bonded thereto so as to eliminate the necessity for the usual soft metal plain main bearings.

Figure 1:
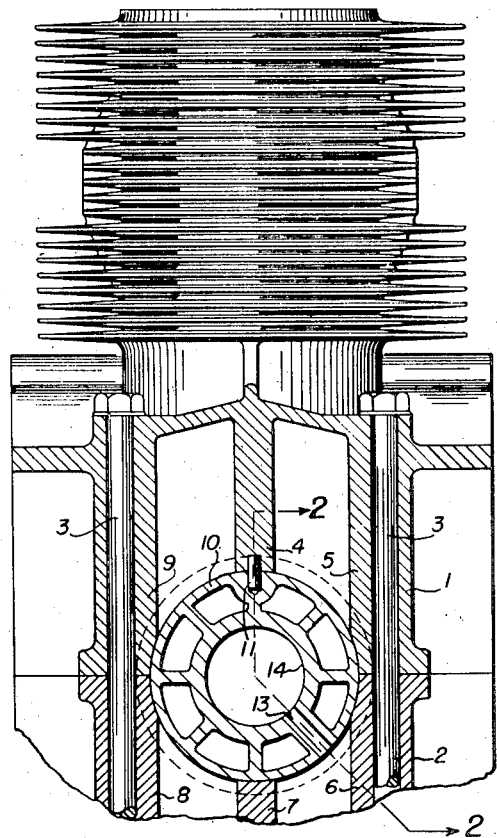
Figure 2:
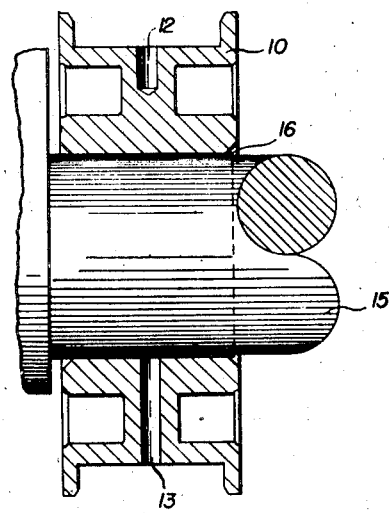

With the foregoing and other objects in view the invention resides in the combination of parts and in the details of construction hereinafter set forth in the following specification and appended claims, certain embodiments thereof being illustrated in the accompanying drawings, in which:

Figure 1 is a fragmentary view, partly in end elevation and partly in vertical section taken through the engine, showing a cylinder in elevation and a removable solid main bearing block; and Figure 2 is a view in section taken along line 2—2 of Figure 1, showing a portion of the crankshaft thereon.

Referring more particularly to the drawings, the engine is shown to comprise two engine block castings 1 and 2 removably secured together by bolts 3 to form supporting walls 4, 5, 6, 7, 8 and 9 to receive and support a solid cylindrical main bearing block 10. This main bearing block 10 is removably held against rotation and displacement by a pin 11 extending into hole 12 in block 10 and an aligned hole in wall 4. An oil drain from the interior to the exterior of block 10 is shown at 13.

The main bearing block may be of nitridable cast iron or nitridable steel and its inner bearing surface 14 nitrided preferably in the manner described in the co-pending application of Ralph M. Heintz for Method of fabricating steel, Serial No. 630,538, filed November 23, 1945, and now abandoned.

The steel crankshaft 15 has its bearing, generally indicated at 16, bonded thereto to include an initial layer of relatively hard metal, such as silver or copper, an initial layer of indium and an outside layer of relatively soft metal, such as lead or cadmium.

The nitriding of the inner bearing surface of the solid removable main bearing block and the crankshaft with its bearing bonded thereto eliminates the necessity of soft metal plain bearings and adjustment shims and adjustment devices.

We claim:

1. In an engine crankshaft bearing assembly,

2 a solid ring main bearing releasably secured to the engine block of nitrided metal to receive in direct surface contact a crankshaft having its bearing bonded thereto and comprising an initial layer of relatively hard metal bonded to the crankshaft, an intermediate layer of indium bonded to said initial layer and an outer layer of relatively soft metal bonded to said indium layer.

2. In an engine crankshaft bearing assembly, a solid ring main bearing releasably secured to the engine block of nitrided metal to receive in direct surface contact a crankshaft having its bearing bonded thereto and comprising an initial layer of silver bonded to the crankshaft, an intermediate layer of indium bonded to said silver layer and an outer layer of relatively soft metal bonded to said indium layer.

3. In an engine crankshaft bearing assembly, a solid ring main bearing releasably secured to the engine block of nitrided metal to receive in direct surface contact a crankshaft having its bearing bonded thereto and comprising an initial layer of silver bonded to the crankshaft, an intermediate layer of indium bonded to said indium layer and an outside layer of lead bonded to said indium.

4. In an engine crankshaft bearing assembly, a solid ring main bearing releasably secured to the engine block of nitrided metal to receive in direct surface contact a crankshaft having its bearing bonded thereto and comprising an initial layer of copper bonded to the crankshaft, an intermediate layer of indium bonded to said copper layer and an outside layer of relatively soft metal bonded to said indium layer.

5. In an engine crankshaft bearing assembly, a solid ring main bearing releasably secured to the engine block of nitrided metal to receive in direct surface contact a crankshaft having its bearing bonded thereto and comprising an initial layer of copper bonded to the crankshaft, an intermediate layer of indium and an outside layer of lead bonded to said indium layer.

RALPH M. HEINTZ.
JOHN W. FRAZIER.

REFERENCES CITED

The following references are of record in the file of this patent:

UNITED STATES PATENTS

| Number | Name | Date |
|---|---|---|
| 1,778,765 | Malcolm | Oct. 21, 1930 |
| 1,997,005 | Morris | Apr. 9, 1935 |
| 2,016,989 | Vickers | Oct. 8, 1935 |
| 2,083,208 | Tofaute | June 8, 1937 |